(12) United States Patent
Holverda et al.

(10) Patent No.: US 9,704,055 B2
(45) Date of Patent: Jul. 11, 2017

(54) OCCLUSION RENDER MECHANISM FOR POINT CLOUDS

(71) Applicant: Autodesk, Inc., San Rafael, CA (US)

(72) Inventors: Paulus Jacobus Holverda, San Leandro, CA (US); Ronald Poelman, San Rafael, CA (US)

(73) Assignee: Autodesk, Inc., San Rafael, CA (US)

( * ) Notice: Subject to any disclaimer, the term of this patent is extended or adjusted under 35 U.S.C. 154(b) by 188 days.

(21) Appl. No.: 14/536,232

(22) Filed: Nov. 7, 2014

(65) Prior Publication Data

US 2015/0123968 A1    May 7, 2015

Related U.S. Application Data

(60) Provisional application No. 61/901,067, filed on Nov. 7, 2013.

(51) Int. Cl.
| | |
|---|---|
| G06K 9/46 | (2006.01) |
| G06T 15/04 | (2011.01) |
| G06T 15/40 | (2011.01) |
| G06T 17/00 | (2006.01) |
| G06K 9/62 | (2006.01) |
| G06T 7/00 | (2017.01) |

(52) U.S. Cl.
CPC ......... *G06K 9/4604* (2013.01); *G06K 9/6218* (2013.01); *G06T 7/0083* (2013.01); *G06T 15/04* (2013.01); *G06T 15/40* (2013.01); *G06T 15/405* (2013.01); *G06T 17/005* (2013.01); *G06T 2207/10012* (2013.01); *G06T 2207/20112* (2013.01); *G06T 2210/12* (2013.01); *G06T 2210/56* (2013.01)

(58) Field of Classification Search
None
See application file for complete search history.

(56) References Cited

U.S. PATENT DOCUMENTS 6,088,035 A * 7/2000 Sudarsky ............... G06T 15/10
345/419
2008/0238919 A1* 10/2008 Pack ...................... G06T 15/04
345/420

OTHER PUBLICATIONS

Ivanov; Practical Texture Atlases; https://web.archive.org/web/20080227091353/http://www.gamasutra.com/view/feature/2530/practical_texture_atlases.php?print=1; captured by the Internet Archive on Feb. 27, 2008.*
Correa et al; iWalk: Interactive Out-Of-Core Rendering of Large Models; Technical Report TR-653-02, Princeton University, 2002.*
Mastin et al.; Automatic Registration of LIDAR and Optical Images of Urban Scenes; IEEE 2009.*
(Continued)

*Primary Examiner* — Maurice L McDowell, Jr.
(74) *Attorney, Agent, or Firm* — Gates & Cooper LLP

(57) ABSTRACT

A method, apparatus, system, article of manufacture, and computer readable storage medium provide the ability to render point cloud data. After obtaining point cloud data, polygons are fit to the point cloud data. A texture atlas is created for each of the polygons. A lookup table is generated from the texture atlases and maps each pixel to a corresponding texture location. When a scene is loaded for rendering/processing, the polygons and texture atlas are loaded and projected into an off-screen buffer that defines a depth map of the scene with approximations of a depth per pixel in screen space. The off-screen buffer is used as a lookup table to determine texture data to be rendered for the scene.

18 Claims, 5 Drawing Sheets

(56) References Cited

OTHER PUBLICATIONS

He et al.; Automatic Orientation Estimation of Multiple Images With Respect to Laser Data; ASPRS 2014 Annual Conference Louisville, Kentucky; Mar. 23-28, 2014.*

Wang, M., et al., "Lidar data segmentation and classification based on octree structure", International Archives of Photogrammetry and Remote Sensing, vol. 20, B3, pp. 308-313, 2004.

* cited by examiner

OCCLUSION RENDER MECHANISM FOR POINT CLOUDS

CROSS-REFERENCE TO RELATED APPLICATIONS

This application claims the benefit under 35 U.S.C. Section 119(e) of the following commonly-assigned U.S. provisional patent application(s), which is/are incorporated by reference herein:

Provisional Application Ser. No. 61/901,067, filed on Nov. 7, 2013, by Paul Holverda and Ronald Poelman, entitled "Occlusion Render Mechanism for Point Clouds".

This application is related to the following commonly-assigned patent application, which application is incorporated by reference herein:

U.S. patent application Ser. No. 14/536,266, entitled "PRE-SEGMENT POINT CLOUD DATA TO RUN REAL-TIME SHAPE EXTRACTION FASTER", by Ronald Poelman and Oytun Akman, filed on the same data herewith, which application claims the benefit under 35 U.S.C. Section 119(e) of Provisional Application Ser. No. 61/901,069, filed on Nov. 7, 2013, by Ronald Poelman and Oytun Akman, entitled "Pre-Segment Point Cloud Data to Run Real-Time Shape Extraction Faster".

BACKGROUND OF THE INVENTION

1. Field of the Invention

The present invention relates generally to point cloud data, and in particular, to a method, apparatus, and article of manufacture for culling point cloud data to represent a displayed point cloud.

2. Description of the Related Art

When attempting to render billions of points in real-time, the bottleneck is to figure out which points are relevant for the screen space representation. Loading all of the points and overwriting the render buffer for every improved/better point results in a far from real-time performance. With points, there is little information that can help determine if it's relevant for screen space or not. A point cloud is entirely see-through because it does not represent a volume. Accordingly, what is needed is a method for culling a point cloud to determine which points are relevant. To better understand these problems, a description of prior art point cloud systems may be useful.

Point clouds are often created by reality capture devices such as laser three-dimensional (3D) scanners that measure a large number of points (e.g., from thousands to many billions of points [3D coordinates]) on the surface of an object, and output a point cloud as a data file. The point cloud represents the visible surface of the object that has been scanned or digitized. With the increased usage of such reality capture devices, large point cloud data sets are more frequently created for consumption by design applications. The challenge that design software faces is visualizing and using this data efficiently in the applications. While the point cloud data set is often very large, the number of points an application is capable of handling for visualization and other needs is a small fraction—a few million points, for example. Prior art methods fail to provide the ability to process the massive volume of points, in real time (e.g., preserving a ten [10] frames per second or faster rate) to read a small fraction of points that have the property of accurately representing the original data set without loss of detail or information that causes misrepresentation of the original data.

Point cloud visualization and applications are increasingly important in design, especially due to the decrease in the price point of the technology. Point clouds can contain an enormous number of points. One of the major challenges is representing the set of points while providing the ability to extract a small subset that is highly representative of the spatial region of interest.

As described above, a point cloud is created using a laser beam/scanner that scans objects/surfaces to obtain millions of points. For example, an image scanner on top of a car that drives through a city may obtain millions upon millions of points. If such points are rendered in a certain environment, different viewpoints may be queried/requested and displayed to a user. However, with a point cloud, if a scene is rendered, the depth component may not map properly. As a result, a visualization of a point cloud may require one thousand (1000) times of overdraw before the correct visualization is achieved.

Prior art methodologies may attempt to select a subset of the points in a quick and efficient manner. One approach divides a volume of interest into equal size rectangular 3D cells. Each of the thousands of cells may contain millions of points. The issue arises as to how to determine how many and which points to select from/in a cell. Further, point cloud data resulting from a scanner may have various artifacts that are undesirable. Accordingly, there is a desire to eliminate the scanner artifact, to normalize the point selection, and to obtain a uniform distribution/real depiction of the distribution of the point cloud data regardless of the location of the scanner. Many prior art approaches have attempted to solve such problems. Such approaches range from nearest neighbor based approaches to frequency domain based approaches. Concepts of downsampling, borrowed from image processing techniques have also been incorporated in solutions to view large point data sets. Goals of some techniques include noise removal and optimal representation, at the expense of computation and with freedom to modify the original point set.

SUMMARY OF THE INVENTION

Embodiments of the invention overcome the problems of the prior art. Instead of using the point clouds themselves for occlusion culling, a textured polygon representation in an off-screen buffer is used to help fetch the best possible representative points (from the point cloud) to render. The textured polygon representation provides a depth map of the scene with approximations of the depth per pixel in screen space and is used to cull those points/textures that are occluded.

BRIEF DESCRIPTION OF THE DRAWINGS

Referring now to the drawings in which like reference numbers represent corresponding parts throughout.

DETAILED DESCRIPTION OF THE PREFERRED EMBODIMENTS

In the following description, reference is made to the accompanying drawings which form a part hereof, and which is shown, by way of illustration, several embodiments of the present invention. It is understood that other embodiments may be utilized and structural changes may be made without departing from the scope of the present invention.

Overview

Embodiments of the invention use a textured polygon representation of a point cloud in an off-screen buffer that is used to fetch the best possible representative points (from a point cloud) to render.

Hardware Environment

Figure 1:
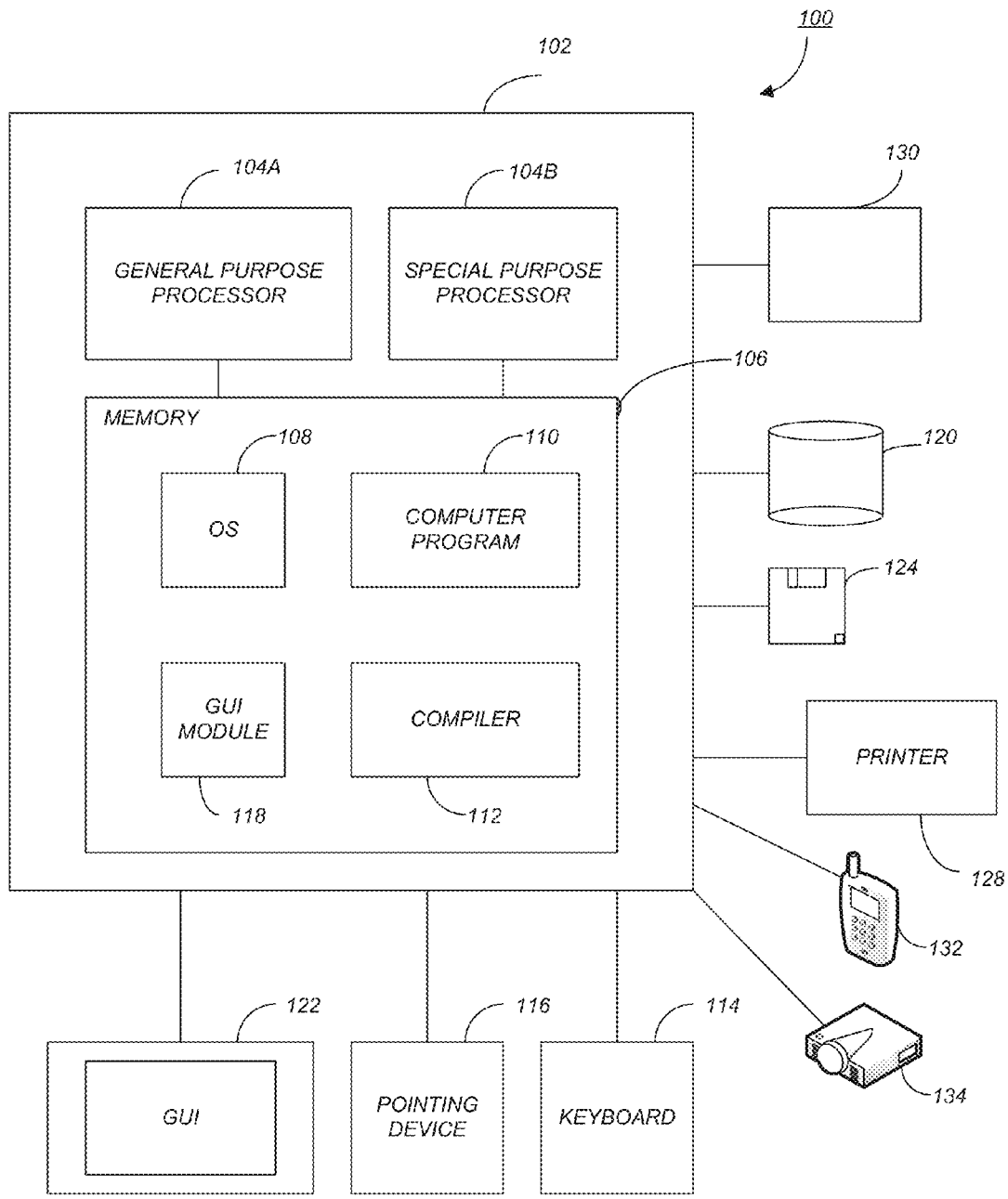
FIG. 1 is an exemplary hardware and software environment used to implement one or more embodiments of the invention.

FIG. 1 is an exemplary hardware and software environment 100 used to implement one or more embodiments of the invention. The hardware and software environment includes a computer 102 and may include peripherals. Computer 102 may be a user/client computer, server computer, or may be a database computer. The computer 102 comprises a general purpose hardware processor 104A and/or a special purpose hardware processor 104B (hereinafter alternatively collectively referred to as processor 104) and a memory 106, such as random access memory (RAM). The computer 102 may be coupled to, and/or integrated with, other devices, including input/output (I/O) devices such as a keyboard 114, a cursor control device 116 (e.g., a mouse, a pointing device, pen and tablet, touch screen, multi-touch device, etc.) and a printer 128. In one or more embodiments, computer 102 may be coupled to, or may comprise, a portable or media viewing/listening device 132 (e.g., an MP3 player, iPod™, Nook™, portable digital video player, cellular device, personal digital assistant, etc.). In yet another embodiment, the computer 102 may comprise a multi-touch device, mobile phone, gaming system, internet enabled television, television set top box, or other internet enabled device executing on various platforms and operating systems.

In one or more embodiments, computer 102 is communicatively coupled to, or may comprise, a laser scanner 134. Such a laser scanner 134 may consist of a field measurement device capable of producing a 3D representation of present conditions through the collection of individually measured points. The set of all points collected and registered with another after the scanning process is referred to as a point cloud. Such a point cloud may be stored in data storage devices 120/124, within the scanner 134, in memory 106, and/or in any other device capable of storing such information. The laser scanner 134 may utilize a variety of scanning methods including aerial, static, and mobile. Such laser scanning may scan millions of point in seconds without climbing on equipment and/or conducting contact measurements.

In one embodiment, the computer 102 operates by the general purpose processor 104A performing instructions defined by the computer program 110 under control of an operating system 108. The computer program 110 and/or the operating system 108 may be stored in the memory 106 and may interface with the user and/or other devices to accept input and commands and, based on such input and commands and the instructions defined by the computer program 110 and operating system 108, to provide output and results.

Output/results may be presented on the display 122 or provided to another device for presentation or further processing or action. In one embodiment, the display 122 comprises a liquid crystal display (LCD) having a plurality of separately addressable liquid crystals. Alternatively, the display 122 may comprise a light emitting diode (LED) display having clusters of red, green and blue diodes driven together to form full-color pixels. Each liquid crystal or pixel of the display 122 changes to an opaque or translucent state to form a part of the image on the display in response to the data or information generated by the processor 104 from the application of the instructions of the computer program 110 and/or operating system 108 to the input and commands. The image may be provided through a graphical user interface (GUI) module 118. Although the GUI module 118 is depicted as a separate module, the instructions performing the GUI functions can be resident or distributed in the operating system 108, the computer program 110, or implemented with special purpose memory and processors.

In one or more embodiments, the display 122 is integrated with/into the computer 102 and comprises a multi-touch device having a touch sensing surface (e.g., track pod or touch screen) with the ability to recognize the presence of two or more points of contact with the surface. Examples of multi-touch devices include mobile devices (e.g., iPhone™, Nexus S™, Droid™ devices, etc.), tablet computers (e.g., iPad™, HP Touchpad™), portable/handheld game/music/video player/console devices (e.g., iPod Touch™, MP3 players, Nintendo 3DS™, PlayStation Portable™, etc.), touch tables, and walls (e.g., where an image is projected through acrylic and/or glass, and the image is then backlit with LEDs).

Some or all of the operations performed by the computer 102 according to the computer program 110 instructions may be implemented in a special purpose processor 104B. In this embodiment, some or all of the computer program 110 instructions may be implemented via firmware instructions stored in a read only memory (ROM), a programmable read only memory (PROM) or flash memory within the special purpose processor 104B or in memory 106. The special purpose processor 104B may also be hardwired through circuit design to perform some or all of the operations to implement the present invention. Further, the special purpose processor 104B may be a hybrid processor, which includes dedicated circuitry for performing a subset of functions, and other circuits for performing more general functions such as responding to computer program 110 instructions. In one embodiment, the special purpose processor 104B is an application specific integrated circuit (ASIC).

The computer 102 may also implement a compiler 112 that allows an application or computer program 110 written in a programming language such as COBOL, Pascal, C++, FORTRAN, or other language to be translated into processor 104 readable code. Alternatively, the compiler 112 may be an interpreter that executes instructions/source code directly, translates source code into an intermediate representation that is executed, or that executes stored precompiled code. Such source code may be written in a variety of programming languages such as Java™, Perl™, Basic™, etc. After completion, the application or computer program 110 accesses and manipulates data accepted from I/O devices and stored in the memory 106 of the computer 102 using the relationships and logic that were generated using the compiler 112.

The computer 102 also optionally comprises an external communication device such as a modem, satellite link, Ethernet card, or other device for accepting input from, and providing output to, other computers 102.

In one embodiment, instructions implementing the operating system 108, the computer program 110, and the compiler 112 are tangibly embodied in a non-transitory computer-readable medium, e.g., data storage device 120, which could include one or more fixed or removable data storage devices, such as a zip drive, floppy disc drive 124, hard drive, CD-ROM drive, tape drive, etc. Further, the operating system 108 and the computer program 110 are comprised of computer program 110 instructions which, when accessed, read and executed by the computer 102, cause the computer 102 to perform the steps necessary to implement and/or use the present invention or to load the program of instructions into a memory 106, thus creating a special purpose data structure causing the computer 102 to operate as a specially programmed computer executing the method steps described herein. Computer program 110 and/or operating instructions may also be tangibly embodied in memory 106, data storage device 120/124 and/or data communications devices 130, thereby making a computer program product or article of manufacture according to the invention. As such, the terms "article of manufacture," "program storage device," and "computer program product," as used herein, are intended to encompass a computer program accessible from any computer readable device or media.

Of course, those skilled in the art will recognize that any combination of the above components, or any number of different components, peripherals, and other devices, may be used with the computer 102.

Figure 2:
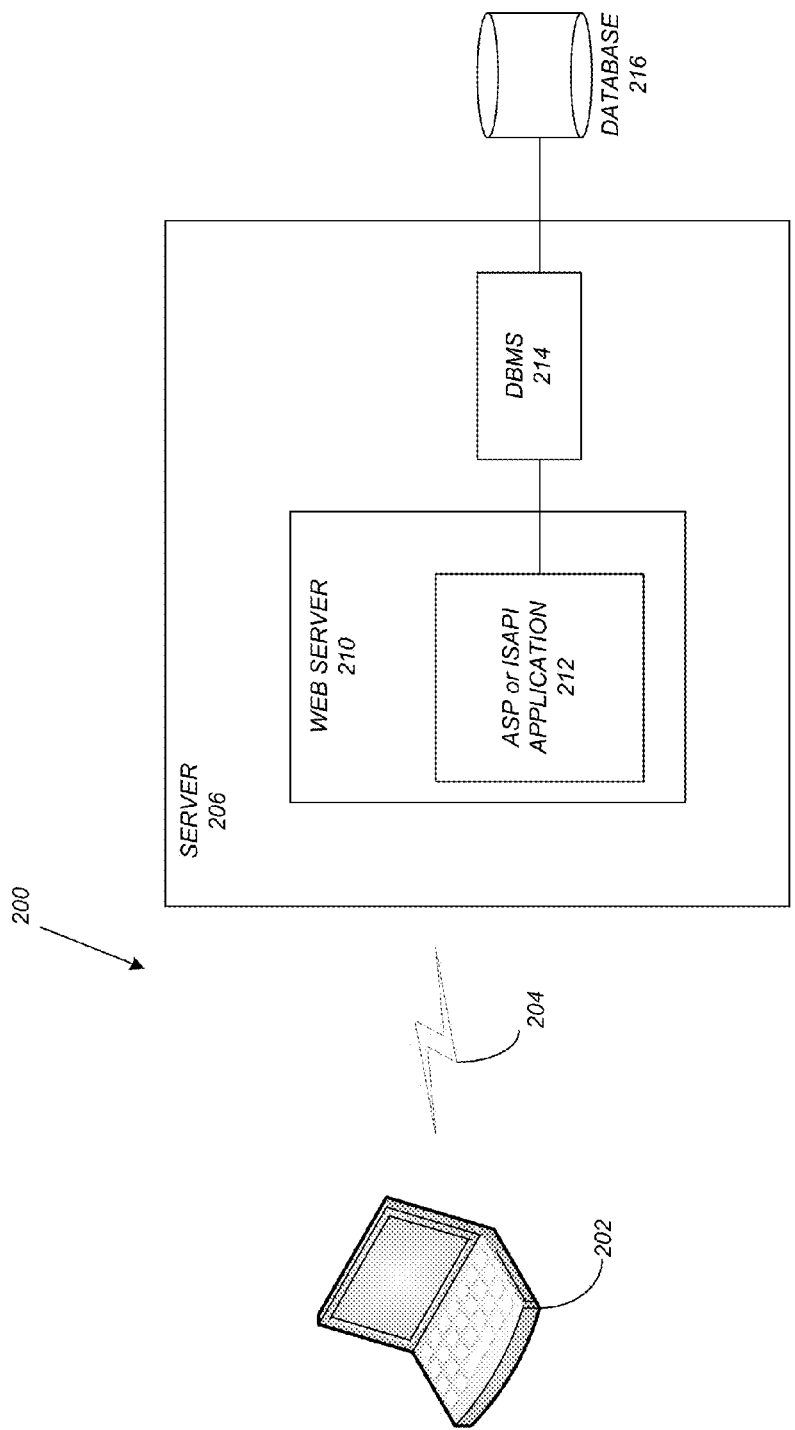
FIG. 2 schematically illustrates a typical distributed computer system using a network to connect client computers to server computers in accordance with one or more embodiments of the invention.

FIG. 2 schematically illustrates a typical distributed computer system 200 using a network 204 to connect client computers 202 to server computers 206. A typical combination of resources may include a network 204 comprising the Internet, LANs (local area networks), WANs (wide area networks), SNA (systems network architecture) networks, or the like, clients 202 that are personal computers or workstations (as set forth in FIG. 1), and servers 206 that are personal computers, workstations, minicomputers, or mainframes (as set forth in FIG. 1). However, it may be noted that different networks such as a cellular network (e.g., GSM [global system for mobile communications] or otherwise), a satellite based network, or any other type of network may be used to connect clients 202 and servers 206 in accordance with embodiments of the invention.

A network 204 such as the Internet connects clients 202 to server computers 206. Network 204 may utilize ethernet, coaxial cable, wireless communications, radio frequency (RF), etc. to connect and provide the communication between clients 202 and servers 206. Clients 202 may execute a client application or web browser and communicate with server computers 206 executing web servers 210. Such a web browser is typically a program such as MICROSOFT INTERNET EXPLORER™, MOZILLA FIREFOX™, OPERA™, APPLE SAFARI™, GOOGLE CHROMET™, etc. Further, the software executing on clients 202 may be downloaded from server computer 206 to client computers 202 and installed as a plug-in or ACTIVEX™ control of a web browser. Accordingly, clients 202 may utilize ACTIVEX™ components/component object model (COM) or distributed COM (DCOM) components to provide a user interface on a display of client 202. The web server 210 is typically a program such as MICROSOFT'S INTERNET INFORMATION SERVER™.

Web server 210 may host an Active Server Page (ASP) or Internet Server Application Programming Interface (ISAPI) application 212, which may be executing scripts. The scripts invoke objects that execute business logic (referred to as business objects). The business objects then manipulate data in database 216 through a database management system (DBMS) 214. Alternatively, database 216 may be part of, or connected directly to, client 202 instead of communicating/obtaining the information from database 216 across network 204. When a developer encapsulates the business functionality into objects, the system may be referred to as a component object model (COM) system. Accordingly, the scripts executing on web server 210 (and/or application 212) invoke COM objects that implement the business logic. Further, server 206 may utilize MICROSOFT'S™ Transaction Server (MTS) to access required data stored in database 216 via an interface such as ADO (Active Data Objects), OLE DB (Object Linking and Embedding DataBase), or ODBC (Open DataBase Connectivity).

Generally, these components 200-216 all comprise logic and/or data that is embodied in/or retrievable from device, medium, signal, or carrier, e.g., a data storage device, a data communications device, a remote computer or device coupled to the computer via a network or via another data communications device, etc. Moreover, this logic and/or data, when read, executed, and/or interpreted, results in the steps necessary to implement and/or use the present invention being performed.

Although the terms "user computer", "client computer", and/or "server computer" are referred to herein, it is understood that such computers 202 and 206 may be interchangeable and may further include thin client devices with limited or full processing capabilities, portable devices such as cell phones, notebook computers, pocket computers, multi-touch devices, and/or any other devices with suitable processing, communication, and input/output capability.

Of course, those skilled in the art will recognize that any combination of the above components, or any number of different components, peripherals, and other devices, may be used with computers 202 and 206.

Software Embodiment

As described above, when attempting to render billions of points in real-time, the bottleneck is to figure out which points are relevant for the screen space representation. Accordingly, it is useful to cull points that are not needed. In this regard, a point cloud may contain millions of points (e.g., from a mobile scanner moving throughout a city). When displaying the scene from a certain viewpoint/vantage point, many points may be occluded by other points. An easy and efficient mechanism for culling such occluded points from a point cloud is useful. Embodiments of the invention provide an occlusion render mechanism that calculates planes with textures to represent a point cloud for culling the point cloud data. More specifically, rather than using the point cloud itself for occlusion culling, a textured polygon representation in an off-screen buffer is used to fetch the best possible representative points to render.

Figure 3:
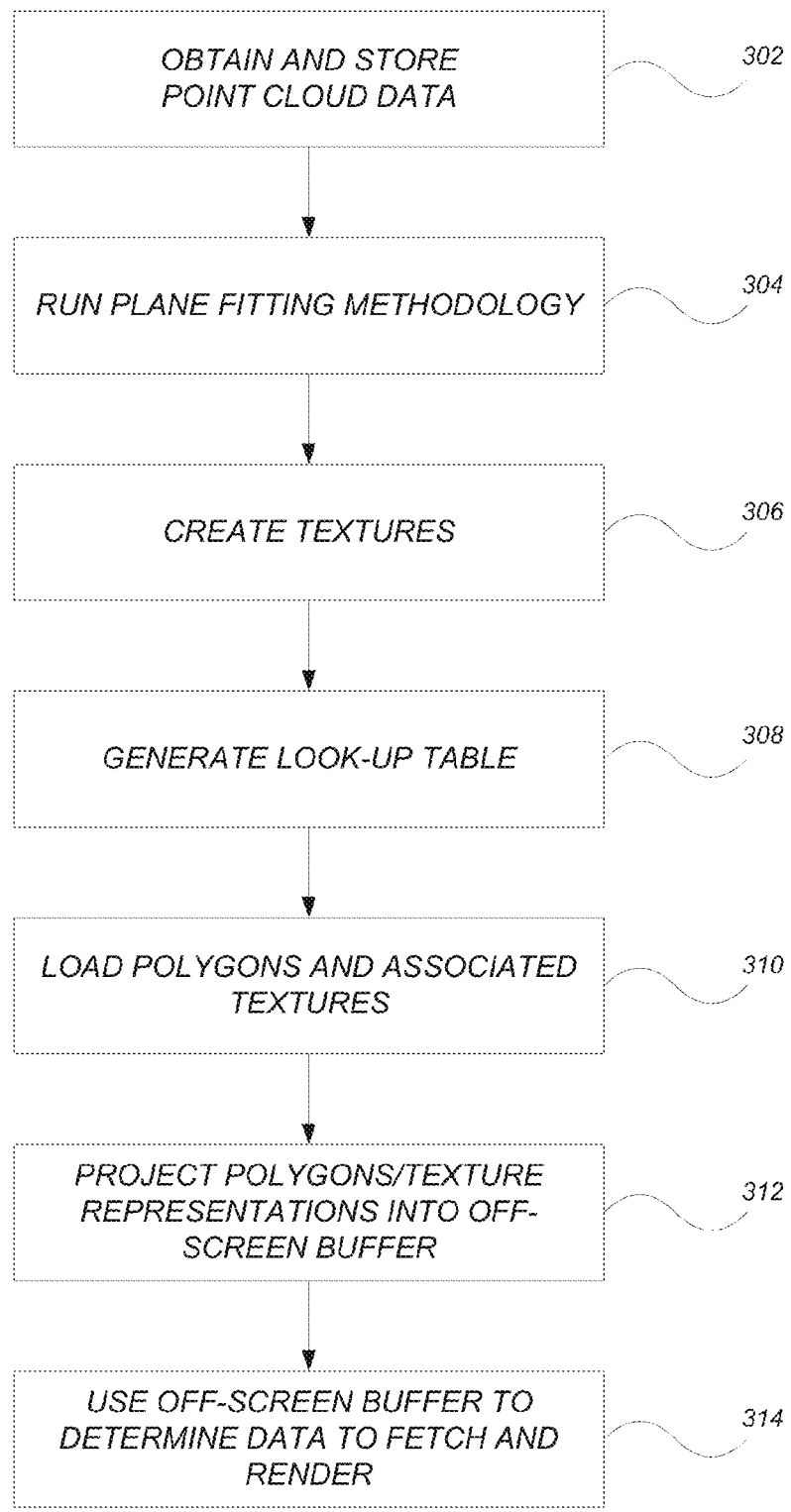
FIG. 3 is a flow chart illustrating the logical flow for rendering point cloud data by culling points in accordance with one or more embodiments of the invention.

FIG. 3 is a flow chart illustrating the logical flow for rendering point cloud data by culling points in accordance with one or more embodiments of the invention.

Figure 4:
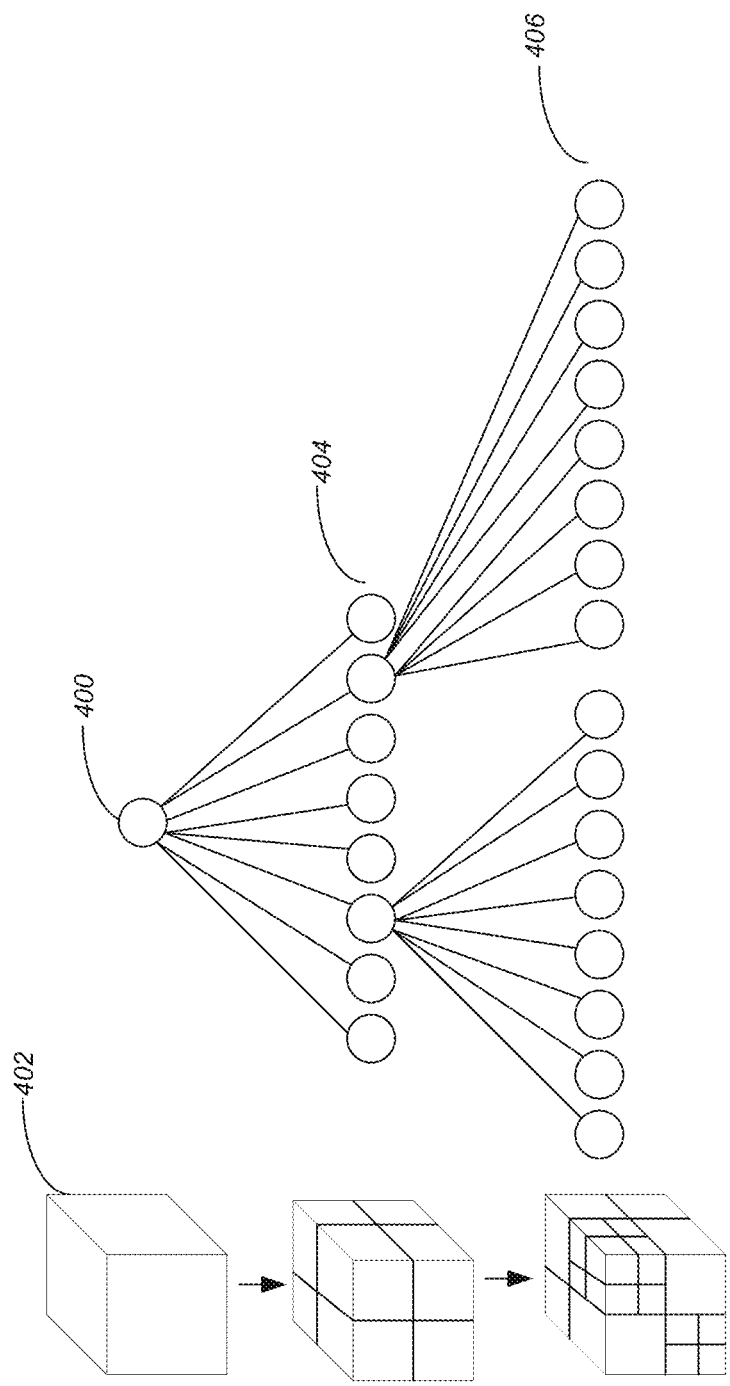
FIG. 4 illustrates an exemplary octree structure in accordance with one or more embodiments of the invention.

At step 302, point cloud data is obtained (e.g., from a laser scanner) and stored in an octree structure. FIG. 4 illustrates an exemplary octree structure in accordance with one or more embodiments of the invention. An octree structure provides a hierarchical tree data structure for the point cloud data. In other words, an octree is a tree-based data structure for organizing and parsing 3D data. Such a structure enables spatial portioning, downsampling, and search operations on the point data set. Each octree node has either eight children or no children. The root node 400 describes a cubic bounding box 402 that encapsulates all points. At every tree level 404/406, the space becomes subdivided by a factor of two (2) which results in an increased voxel (i.e., a volumetric pixel that represents a value on a regular grid in 3D space) resolution.

At step 304, at a relevant tree depth distance (determined by size or amount of points), a plane fitting methodology is run (e.g., based on RANSAC [RANdom Sample Consensus]). RANSAC is an iterative method used to estimate parameters of a mathematical model from a set of observed data that contains outliers. Accordingly, at step 304, embodiments of the invention iteratively attempt to find all of the planes and clip them with the bounds of the relevant tree depth leaf node. Examples of such a plane fitting include least squares fitting (LSF) and principal component analysis (PCA). In LSF, an iterative method is used to find the best-fit plane with the least-squares constraint of the distances from the scanned points to the plane (e.g., see Wang, M. and Tseng, Y.-H., 2004, Lidar data segmentation and classification based on octree structure, International Archives of Photogrammetry and Remote Sensing, Vol. 20, B3, pp. 308-313 which is incorporated by reference herein).

More specifically, in step 304, an attempt is made to create and fit planes on all the points within a predefined level of detail of the octree. The number of planes is dependent on the amount of points that conform to the plane fitting procedure and within a certain threshold. In this regard, the threshold may determine whether a maximum and/or minimum number of points are present in a predefined level. For example, a minimum number of points may be required in order to perform plane fitting (e.g., one or two points may not comply with the minimum threshold number of points while ten points may be sufficient). Similarly, too many points may be overly burdensome to perform the planet fitting (e.g., consumes a disproportionate amount of processing and/or time).

In view of the above, if level 404 is identified as the relevant level, the points within the nodes below level 404 would be used for the plane fitting procedures. Thus, the appropriate octree level may be determined based on size (of the bounds of the level) or amount of points.

If based on the number/amount of points, the plane fitting process may progressively select sequential levels of the octree until a sufficient/maximum number of points/per node for processing has been reached. For example, suppose the plane fitting can process a maximum number of 25,000 points. If level 400 has one million points, the plane fitting may proceed to level 404 which may have 125,000 points. Since 125,000 is still beyond the maximum number of permissible points, the plane fitting may proceed to level 406 which could have 15,625 points per node. Since level 406 provides a number of points per node within the processing threshold, the plane fitting may identify level 406 as the relevant level.

During the plane fitting, the detected planes are clipped with the bounds of the determined leaf node level of the octree to create representative polygons.

At step 306, UV coordinates are created for every polygon in the octree resulting in a 2D texture atlas per polygon. As used herein, a texture atlas is simply a large image/texture containing a collection of (smaller) sub-images, each of which is a texture for some part of the polygon. The points that are used to create the plane that evolved into a polygon shape are back projected onto the texture atlas. The texture size of the resulting texture can be set at any resolution, typically determined by the amount of points that are back projected. After the texture creation, the individual textures are stacked into a single large texture atlas per octree (that is subsequently used).

At step 308, a lookup table is generated from the single large texture atlas per octree. In other words, the single large texture atlas per octree serves as a lookup table and simply maps each pixel (in each polygon) to its texture location in the atlas.

At step 310, when a scene is loaded (e.g., for processing/rendering), all of the scans/octrees associated with the scene are loaded. In addition, when the scans are loaded, the polygons and associated textures are loaded with them.

At step 312, the polygon/texture representations are projected in an off-screen buffer. The resolution of the off-screen buffer is determined by the resolution of the used canvas and the desired detail. In this regard, the resolution of the off-screen buffer may be the same as the resolution of the used canvas (or a user may select/define a desired resolution). As used herein, the used canvas is the modeling space (e.g., 3D modeling space) that is being used to render a scene/model. The off-screen buffer provides a depth map of the scene with approximations of the depth per pixel in screen space.

Figure 5:
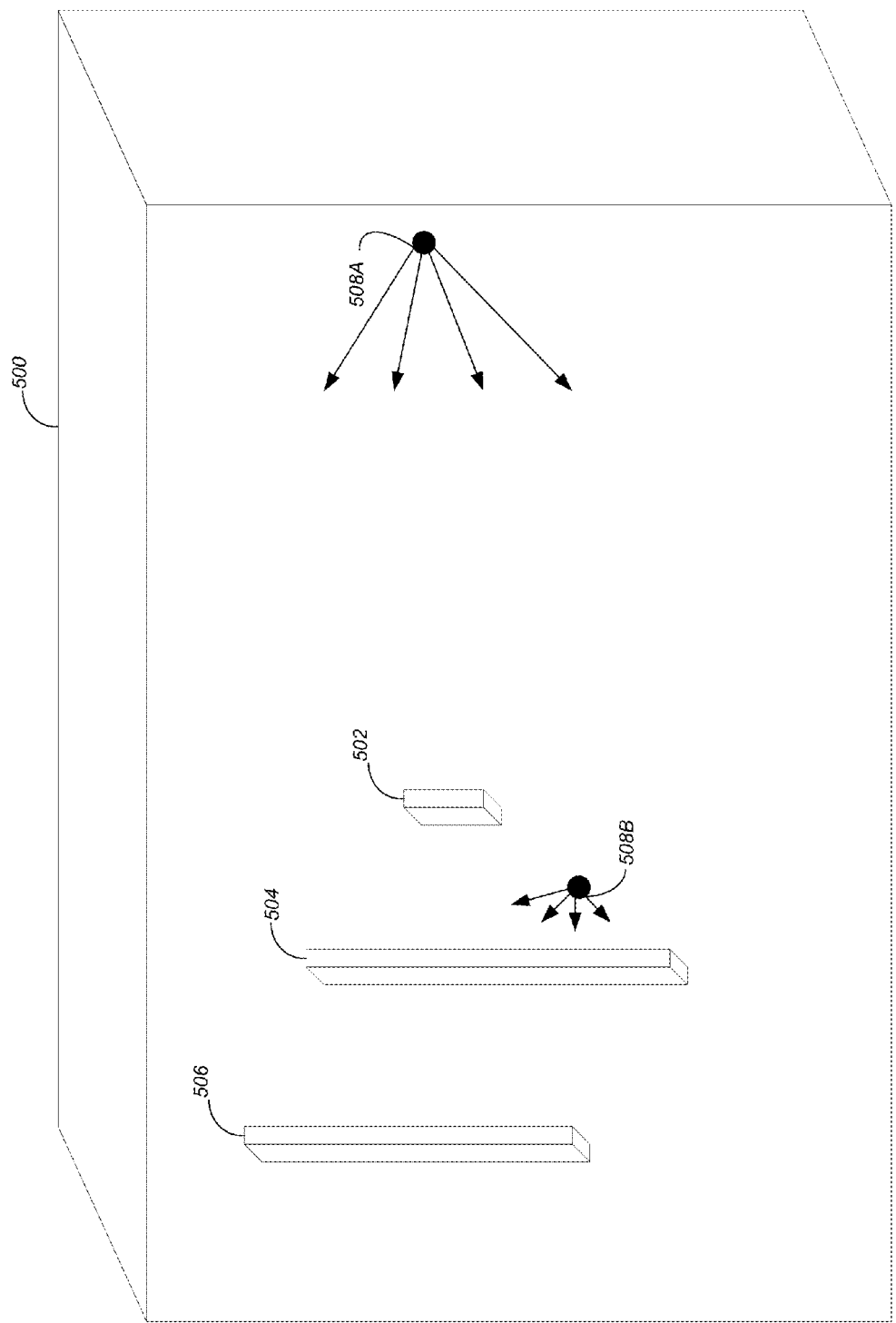
FIG. 5 illustrates an exemplary off-screen buffer in accordance with one or more embodiments of the invention.

At step 314, the off-screen buffer is used as a lookup table to determine the data (e.g., texture data) to be rendered for the scene (including fetching the data from disk). With this information, it is easy to determine which scans have screen space relevant data and need to be rendered to the canvas. In one or more embodiments, every visible node may have a color for id. That color may be used to fetch the correct data from disk. An exemplary off-screen buffer 500 is illustrated in FIG. 5 in accordance with one or more embodiments of the invention. Polygons 502, 504, and 506 are projected into the off-screen buffer 500. When a viewing frustum 508 (i.e., frustum locations 508A and 508B) is identified in the viewing/used canvas (e.g., by the viewer moving/displaying a model or 2D view of a 3D scene), the same frustum 508 is utilized to identify a location in the off-screen buffer 500. Based on the viewing frustum 508, the off-screen buffer 500 can be used to determine whether each pixel in polygons 502-506 is occluded or not.

For example, from viewing frustum 508A, the portions of polygons 504 and 506 may be occluded by polygon 502. Similarly, only the top portion of polygon 506 is not-occluded by polygons 502 and 504. Based on whether a pixel is identified as an occluded pixel or not (e.g., via 0 or 1, occluded or not) in the off-screen buffer 500, corresponding texture data may be retrieved (e.g., from disk). Thus, only the corresponding texture data from pixels identified as not-occluded are retrieved from disk during a scene rendering operation.

Similarly, if the viewing frustum 508 is moved to a new location (e.g., from frustum 508A to frustum 508B), the off-screen buffer 500 is recomputed to determine whether pixels are occluded or not. Consequently, with frustum 508B, polygon 502 is marked as occluded as it is no longer being viewed. Similarly, all of the pixels in polygon 506 may now be marked as being occluded by polygon 504.

The approach described herein circumvents the loading of unnecessary data from disk resulting in slow speed and useless overdraws. The off-screen buffer 500 helps culling 80-90% of the point cloud data that normally would have been loaded from disk

CONCLUSION

This concludes the description of the preferred embodiment of the invention. The following describes some alternative embodiments for accomplishing the present invention. For example, any type of computer, such as a mainframe, minicomputer, or personal computer, or computer configuration, such as a timesharing mainframe, local area network, or standalone personal computer, could be used with the present invention. In summary, embodiments of the invention provide a high predictability of data that needs to be loaded to represent a point cloud in screen space. Accordingly, a magnitude less points need to be fetched from disk resulting in less overdraw. Further, by culling the points appropriately, a high density visualization of the point cloud results with less processing/overhead.

The foregoing description of the preferred embodiment of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto.

What is claimed is:

1. A computer-implemented method for rendering point cloud data, the method comprising the steps of:
    obtaining point cloud data;
    fitting one or more polygons to the point cloud data;
    creating a texture atlas for each of the one or more polygons;
    generating a first lookup table from the texture atlases, wherein the first lookup table maps each pixel in each of the one or more polygons to a corresponding texture location in the texture atlas;
    loading a scene for processing/rendering;
    when the scene is loaded, loading the one or more polygons and the texture atlas;
    projecting the one or more polygons and the texture atlas into an off-screen buffer, wherein the off-screen buffer defines a depth map of the scene with approximations of a depth per pixel in screen space;
    utilizing the off-screen buffer as a second lookup table to determine texture data to be rendered for the scene, wherein the off-screen buffer is used to determine whether each pixel in the one or more polygons is occluded or not; and
    rendering the scene with the texture data, wherein the rendering comprises retrieving corresponding texture data, from pixels identified as not-occluded, from disk.

2. The computer-implemented method of claim 1, wherein the obtaining comprises storing the point cloud data in an octree structure.

3. The computer-implemented method of claim 2, wherein the fitting is performed at a determined tree depth of the octree structure.

4. The computer-implemented method of claim 3, wherein the fitting comprises:
    creating and fitting one or more planes to the point cloud data; and
    clipping the one or more planes with bounds of a leaf node at the determined tree depth to create the one or more polygons.

5. The computer-implemented method of claim 4, wherein creating the texture atlas comprises back projecting one or more points used to create each of the one or more planes, onto the texture atlas.

6. The computer-implemented method of claim 2, further comprising:
    stacking each of the texture atlases for each of the one or more polygons into a single large texture atlas per octree, wherein the single large texture atlas comprises the texture atlas.

7. The computer-implemented method of claim 1, wherein a resolution of the off-screen buffer is determined by a resolution of a used canvas where the scene is to be rendered.

8. The computer-implemented method of claim 1, wherein the data to be rendered for the scene is fetched from disk based on the use of the off-screen buffer as the second lookup table.

9. The computer-implemented method of claim 1, wherein the utilizing the off-screen buffer comprises:
    determining, based on a viewing frustum and the off-screen buffer, whether texture data for each pixel is occluded; and
    fetching and rendering texture data that is not occluded.

10. A non-transitory computer readable storage medium encoded with computer program instructions which when accessed by a computer cause the computer to load the program instructions to a memory therein creating a special purpose data structure causing the computer to operate as a specially programmed computer, executing a method of rendering point cloud data, the method comprising the steps of:
    obtaining, in the specially programmed computer, the point cloud data;
    fitting, in the specially programmed computer, one or more polygons to the point cloud data;
    creating, in the specially programmed computer, a texture atlas for each of the one or more polygons;
    generating, in the specially programmed computer, a first lookup table from the texture atlases, wherein the first lookup table maps each pixel in each of the one or more polygons to a corresponding texture location in the texture atlas;
    loading, in the specially programmed computer, a scene for processing/rendering;
    when the scene is loaded, loading, in the specially programmed computer, the one or more polygons and the texture atlas;
    projecting, in the specially programmed computer, the one or more polygons and the texture atlas into an off-screen buffer, wherein the off-screen buffer defines a depth map of the scene with approximations of a depth per pixel in screen space;
    utilizing, in the specially programmed computer, the off-screen buffer as a second lookup table to determine texture data to be rendered for the scene, wherein the off-screen buffer is used to determine whether each pixel in the one or more polygons is occluded or not; and
    rendering, via the specially programmed computer, the scene with the texture data, wherein the rendering comprises retrieving corresponding texture data, from pixels identified as not-occluded, from disk.

11. The non-transitory computer readable storage medium of claim 10, wherein the obtaining comprises storing the point cloud data in an octree structure.

12. The non-transitory computer readable storage medium of claim 11, wherein the fitting is performed at a determined tree depth of the octree structure.

13. The non-transitory computer readable storage medium of claim 12, wherein the fitting comprises:
    creating and fitting one or more planes to the point cloud data; and clipping the one or more planes with bounds of a leaf node at the determined tree depth to create the one or more polygons.

14. The non-transitory computer readable storage medium of claim 13, wherein creating the texture atlas comprises back projecting one or more points used to create each of the one or more planes, onto the texture atlas.

15. The non-transitory computer readable storage medium of claim 11, further comprising:
stacking each of the texture atlases for each of the one or more polygons into a single large texture atlas per octree, wherein the single large texture atlas comprises the texture atlas.

16. The non-transitory computer readable storage medium of claim 10, wherein a resolution of the off-screen buffer is determined by a resolution of a used canvas where the scene is to be rendered.

17. The non-transitory computer readable storage medium of claim 10, wherein the data to be rendered for the scene is fetched from disk based on the use of the off-screen buffer as the second lookup table.

18. The non-transitory computer readable storage medium of claim 10, wherein the utilizing the off-screen buffer comprises:
determining, based on a viewing frustum and the off-screen buffer, whether texture data for each pixel is occluded; and
fetching and rendering texture data that is not occluded.

\* \* \* \* \*